Dec. 17, 1935.  R. J. EVANS, JR  2,024,439
ABRASION RESISTANT LINING WITH SUPPORTING STRUCTURE
Filed Nov. 18, 1933
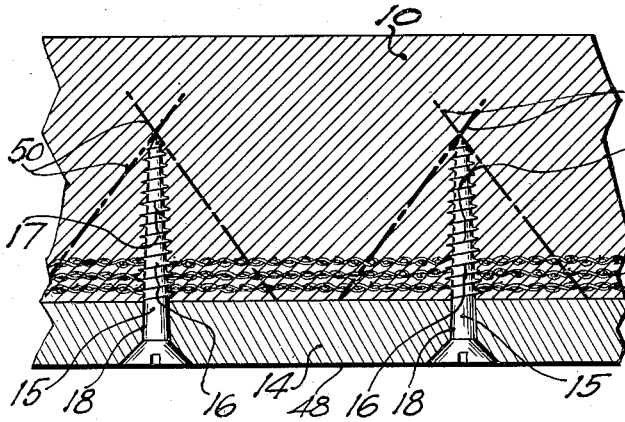
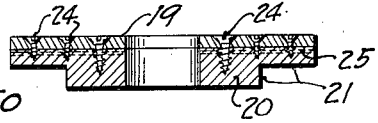
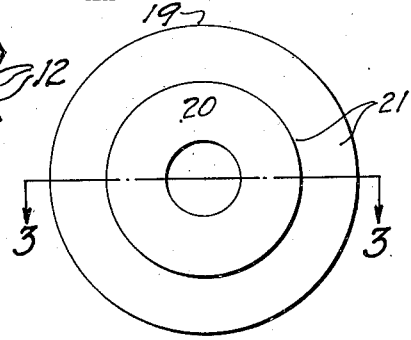
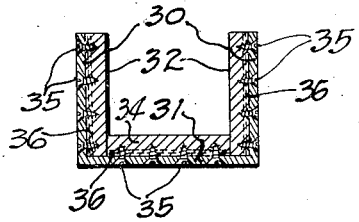
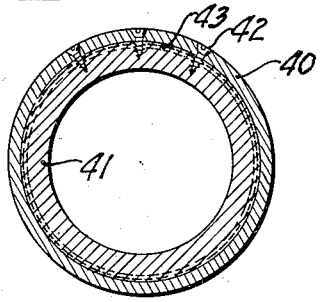
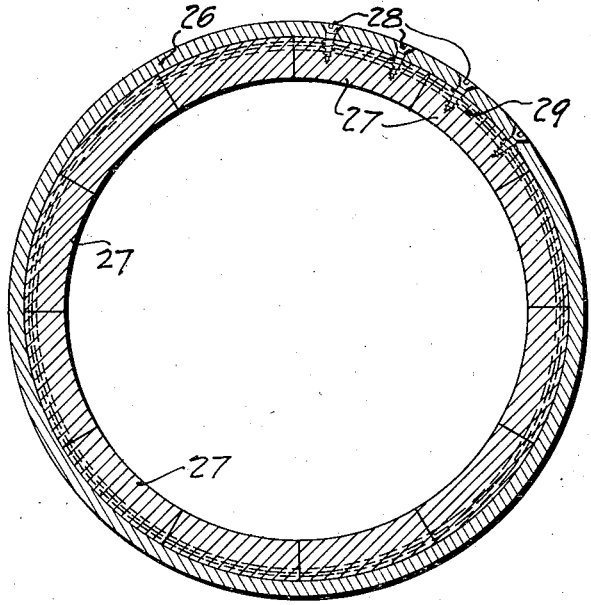
INVENTOR
R. J. EVANS, JR.
BY
ATTORNEY Patented Dec. 17, 1935

2,024,439

UNITED STATES PATENT OFFICE 2,024,439

ABRASION-RESISTANT LINING WITH SUPPORTING STRUCTURE

Richard J. Evans, Jr., Bauer, Utah

Application November 18, 1933, Serial No. 698,728

7 Claims. (Cl. 138—64)

This invention relates to an abrasion-resistant lining with its supporting structure, and more particularly to an abrasion-resistant lining for pumps, ball mills, agitators, flotation machines, tanks, chutes, pipes, and so on, the wearing parts of all of which are subject to considerable deterioration due to contact with abrasive material passing through these various types of apparatus.

As is well known, vulcanized rubber of suitable composition very effectually resists abrasive wear and is in common use as a protective covering or lining for the wearing parts of apparatus and machinery of many kinds.

The successful application of rubber for the purposes just enumerated, requires first, that a sufficient thickness of rubber be used to adequately cushion the most severe shock or impact to which the rubber may be subjected, and second, that the rubber be securely fastened to the backing member or structure, supporting it.

The supporting members for the rubber are usually in the shape of steel or cast iron walls or plates, and various methods of fastening the rubber to the supporting members have heretofore been used. Among such methods may be mentioned vulcanizing the rubber directly to the supporting members, or attaching the rubber to the supporting members, by means of bolts which pass through both.

Where bolts are used, they are provided with relatively large heads which serve to clamp the rubber under the heads, in place. Vulcanizing has the disadvantage that it requires special manufacturing equipment and must be done at the factory, while the rubber cannot be detached and replaced when renewal is necessary in the field. Bolting has the disadvantage that the heads, even when protected with the rubber covering, wear more rapidly than the surrounding rubber, and must frequently be replaced. Also, the rubber under the bolt heads is in a state of relatively high compression compared with the other parts of the lining, thereby shortening its life considerably. Furthermore, the rubber between the bolts is stretched and distorted, which also results in shortening the life of the lining.

In still another method of fastening which has heretofore been used, metal channels are imbedded in the rubber at the time of manufacture. The channels are located in the back of the lining and have inwardly projecting portions forming slots extending the full length of the channels. The rubber, which is in the form of slabs, must be installed in the apparatus by sliding the slabs longitudinally along a row of bolts which project loosely through holes in the supporting member and engage the channels in such a manner that the heads of the bolts may be drawn against the inwardly projecting portions of the channels, and tightened by means of nuts on the outside of the supporting members. Obviously, this method is limited in its use to such apparatus which allows the rubber slabs to be installed, by sliding them into place longitudinally. This is not possible in many cases, and besides, the method is rather expensive and the channels must be imbedded in the rubber at the factory.

In its preferred form, the present invention consists of sheets, slabs, cylinders, or any other suitable shapes of rubber, in which are imbedded, for example by vulcanizing, one or more layers of a woven fabric, preferably an open mesh textile material. The imbedded fabric is disposed in close proximity to the back, or surface of contact between the lining and the supporting member. The lining is then fastened in place by means of screws which may be inserted through holes in the supporting members and threaded into the rubber lining. The surfaces of the threads engage the textile fabric as well as portions of the rubber itself, and thus secure a substantial hold upon the lining.

It will readily be seen that the screws may be tightened from the outside of a supporting wall and the lining be thereby drawn tightly against the inside of the wall, without imposing any detrimental stresses upon the rubber. The screws preferably, do not extend clear through the rubber lining, which leaves the working surface of the rubber free and unimpaired in its exposure to the material passing through any apparatus or machine equipped with the present invention.

In brief, the rubber is firmly attached to the supporting member without compressing or distorting the wearing part of the rubber, and without perforating its wearing surface or creating any weak spots therein, while at the same time, a uniform wearing body and a smooth wearing surface are secured, with the added advantage that the rubber covering may be quickly installed in place, and when necessary, may be quickly replaced without difficulty. It is to be noted that the function of the fabric imbedded in the rubber, is not merely to engage the screws, but is also for the purpose of preventing the distortion of the rubber between the screws, since such distortion might, under severe usage, result in the loosening and rapid deterioration of the lining.

The features of this invention for which the protection of Letters Patent of the United States is desired, are collectively grouped in the claims concluding this specification.

In the drawing,

Fig. 1 represents a fragmentary cross-section taken through a metallic plate lined with rubber in accordance with this invention, and showing in detail, the general structure thereof;

Fig. 2, the inside elevation of a pump casing head, lined as specified herein;

Fig. 3, a section taken on line 3—3 in Fig. 2;

Fig. 4, a cross-section taken through the barrel of a ball or pebble mill, lined as specified herein;

Fig. 5, a lined ore chute; and

Fig. 6, a lined pipe.

Referring to the drawing, the numeral 10, Fig. 1, indicates a relatively thick slab or sheet of rubber of suitable composition, in which are imbedded the layers 12 of a woven fabric, consisting preferably of an open mesh textile. These layers are preferably spaced apart from one another and are imbedded at or near the back or unexposed side of the rubber block or slab, this unexposed surface being in close contact with the inner surface of the metallic supporting member or shell 14. Screws of a suitable kind, for example, ordinary wood screws 15, extend through the metal 14 and engage the rubber block 10. Some of the threads, such as those indicated at 16, are firmly intrenched in the fabric layers 12, and naturally have a bearing therein substantially equal to the depth of the thread, so that, when the screws are driven home, the entire block 10 is drawn firmly into close contact with the supporting wall 14. The remaining threads 17 of the screw take a firm hold in the soft rubber portion of the block 10 and assist in holding the block, as well as serving to steady the same.

The hole 18 in the metal 14 which accommodates the shank of the screw, may be a trifle larger in diameter (not shown) than the shank itself, so as to allow for a small movement of the screw relative to the supporting member 14, occasioned possibly, by a slight flexing in the rubber block. While screws having flat, countersunk heads are preferred, since they leave the outside surface 48 of the supporting member smooth and unobstructed, yet screws with heads of any desired style may be used if desired.

Attention has been directed to the fact that the fabric layers 12 are necessary to secure the full advantages of this invention, but still, if these fabric layers are left out and the screws are driven directly into the soft rubber, many of the advantages of this invention will still be realized.

In Figs. 2 and 3 is illustrated the head or follower plate 19 of a sand pump, with the rubber lining 20, which latter has the shouldered annular portion 21 and is fastened against the head 19 by means of screws 24, the latter passing through the fabric layers 25 as previously explained.

In Fig. 4, the shell 26 of a ball or pebble mill has the lining 27 fastened in place by means of the screws 28 passing through the fabric layers 29.

In Fig. 5, the sides 30 and bottom 31 of an ore chute are lined respectively with the rubber blocks 32 and 34, these being fastened in place by the screws 35 passing through fabric layers 36.

The pipe 40, in Fig. 6, may have the lining 41 fastened by means of the screws 42 passing through the fabric layers 43.

In order to obtain the best results, the mesh of the fabric should be sufficiently open to insure the complete enclosure of the threads of the fabric in the body of the rubber, and yet the mesh should be close enough that the threads of the fabric are engaged by the threads of the screws which penetrate and hold the lining in place.

The weight of the fabric, the number and spacing of the layers thereof, and the thickness of the wearing portion of the rubber, will depend upon the nature of the service in which the invention is used. In the case of very light service, the textile fabric may be left out altogether, as hereinbefore touched upon.

The application of this invention to the lining of sand pumps, such as the Wilfley, is one of extreme usefulness. It is well known to flotation mill operators that the life of the Wilfley pump follower plate which is usually made of cast iron, is relatively brief, varying from six days to six months, depending upon the degree of coarseness of the ore handled. Such a follower plate, lined in accordance with the present invention, as typified in Figs. 2 and 3, increases this life as many as ten times over.

In the case of ball or pebble mills, an especially useful and efficient lining is made possible by using the present invention. In machinery of this character, three or more layers of heavy fabric 12, Fig. 1, should be used, and a relatively thick layer of wearing rubber provided to secure the maximum cushioning effect.

The spacing of the screws employed to hold the rubber lining against the supporting member, varies with the various uses to which the invention may be applied, but in any event, the spacing of the screws, center to center, must be sufficiently close so that the requisite resistance to distortion of the rubber between the screws is secured. Especial attention should be paid to this spacing in cases where heavy loads are encountered by the resilient lining, for example, in ball mills and other rock grinding machinery. Here, the spacing should be so proportioned that the tremendous pounding upon the lining shall not distort the lining between the points of fastening, more than results naturally because of the resiliency of the rubber.

The holding effect manifested by the screws upon the rubber lining, may be best explained by reference to Fig. 1, where the inclined lines 50 drawn from the points of screws 15 towards the back of the lining, form elements of imaginary cones. The cones represent approximately the zones of stresses exercised by the screws upon the rubber. From this it can readily be seen that substantially no stresses imposed by the screws, exist outside of the conical zones, thus leaving the rubber outside these zones, free from the detrimental stresses imposed when bolts are used as the fastening means between the rubber lining and the supporting member. As a consequence, the full resiliency of the rubber is made available to serve a useful end.

The effective holding capacity of a screw in the present invention, is measured by the lateral area of the screw threads, and the threads should be of such a pitch that sufficient space is provided for the rubber to substantially touch the circumferential surface of the body of the screw between successive threads. Ordinary wood screws, as purchased in the open market, possess very satisfactory proportions of lateral thread area and pitch for the general purposes of this invention, but special screws for particular cases, must be designed to suit individual requirements.

In order to clearly differentiate the novelty of the present invention over anything else for a similar purpose of which I am aware, its merits are summarized as follows:

The resilient lining of my invention, in the direction of its thickness, defines two clearly marked portions or zones, first, a stressed zone which lies between the contacting surface of the supporting member and the apices of the stress cones shown by the lines 50 in Fig. 1; and second, a relaxed portion or zone, which lies between the apices of the stress cones and the inner or working surface of the resilient lining. This working surface is, of course, opposite to the contact surface, as clearly indicated in the figures, and the contact surface conforms to the configuration of the supporting member.

It is to be particularly noted that nothing heretofore used as the fastening means between a supporting member and a resilient lining, approaches even remotely, the tapering screws with threads of large pitch and points which dig their way into the resilient lining, thus assuring a mutually firm engagement between screws and lining, indicated in the figures. In every instance of prior fastenings where members, usually bolts, have been used, such bolts have cylindrical bodies with threads of small pitch, which threads do not engage the resilient lining directly, but depend for their holding power upon nuts or like members which engage the threads, and which bear against metal inserts. In other cases, the bolts are inserted from the inside surface of the lining, so that tightening of the nuts stresses a considerable area of the resilient material around each head, and these stressed areas, when struck by abrasive or other material in the course of its passage over the surface, quickly give way. In contrast, the stressed portions of my improved lining are far under the working surface, due to the relaxed portion of the resilient material above, with the result that this relaxed portion harmlessly takes up the direct punishment of the material passing over the lining.

Inasmuch as I am aware that it is old to fasten resilient linings to supporting structures, and also, that it is old to use certain fastening elements for holding resilient linings tightly in place on supporting structures, I do not claim such items unreservedly, but restrict the broad aspect of my invention to a supporting structure with a resilient lining which is held tightly in place by screws having suitable threads in direct engagement with the resilient lining material, and so disposed that each screw extends through the supporting structure and into a stress zone occupying a fractional part of the thickness of the resilient lining next the supporting structure, thereby leaving an appreciable portion of the resilient lining as a relaxed zone between the stress zone and the inside or wearing surface of the resilient lining.

It is to be understood that various changes can be made in minor parts of the invention as herein described, without departing from the spirit and scope of the following claims.

Having fully described my invention, what I claim is:

1. An abrasion-resistant lining with a supporting element, including in combination, a supporting element, a relatively thick slab of abrasion-resistant material having a layer of woven fabric imbedded therein in proximity to one surface, the said one surface being in contact with a surface of the supporting element; and screws extending through the supporting element and through the said layer of woven fabric in such a manner that the abrasion-resistant lining is tightly held against said supporting element.

2. An abrasion-resistant lining with a supporting element, including in combination, a supporting element, a relatively thick slab of resilient material having a plurality of layers of woven fabric spaced apart from one another and imbedded in the slab in proximity to the surface where the slab contacts the supporting element; and screws extending through the supporting element and through the said layers of woven fabric in such a manner that said resilient lining is tightly held against the supporting element.

3. A supporting wall, a relatively thick lining of vulcanized rubber in close contact with said wall, said rubber lining having a layer of woven fabric imbedded therein in close proximity to the wall-contacting surface, and screws extending through the said wall and through the said layer of woven fabric, said screws being spaced sufficiently close together so as to substantially counteract the tendency to lateral distortion in the structure of the rubber lining when exposed to working stresses, said screws further, being disposed to be drawn up tightly, thereby providing the aforesaid close contact between the wall and the rubber lining.

4. A resilient lining comprising a rubber cushion in substantially sheet form, a supporting wall in close contact with a surface of said sheet, and screws extending through the said wall into the rubber cushion, said screws having threads in direct engagement with a limited portion of the thickness of the cushion and being disposed for drawing up tightly, thereby providing the aforesaid close contact between the cushion and the wall, and at the same time leaving that portion of the lining between the ends of the screws and the inner surface of the lining, relaxed.

5. A resilient lining comprising a rubber cushion having a contacting surface, a wall in close contact with said contacting surface, and screws extending through said wall into said rubber cushion, said screws having heads bearing against portions of said wall and having threads in engagement with a fractional portion of the thickness of the said lining, the said screws being spaced sufficiently close to one another so as to prevent undue internal distortion in the said cushion, when said cushion is exposed to regular working stresses.

6. A resilient lining exposed to abrasive action, comprising a rubber cushion having a surface of contact, a supporting member adjacent said surface of contact, and screws extending through said supporting member and into said rubber cushion, said screws having threads spaced sufficiently far apart from one another so the rubber contacts the body circumference of the screws and of sufficient depth to firmly engage said rubber cushion, but leaving an appreciable portion of the rubber cushion relaxed beyond the ends of said screws.

7. A walled structure with resilient lining, including a supporting wall having a contact surface; a resilient lining having a surface conforming to the said contact surface, a working surface opposite said conforming surface, a stress zone along the conforming surface, and a relaxed zone along the working surface; and screws extending through the supporting wall and the said stress zone, said screws having bodies with threads of relatively large pitch, said screws being operable to dig into the material of the said stress zone, thereby assuring close contact between the screw thread and the resilient lining.

RICHARD J. EVANS, Jr.